United States Patent [19]
Reiter et al.

[11] Patent Number: 4,751,578
[45] Date of Patent: Jun. 14, 1988

[54] SYSTEM FOR ELECTRONICALLY CONTROLLABLY VIEWING ON A TELEVISION UPDATEABLE TELEVISION PROGRAMMING INFORMATION

[75] Inventors: Eli Reiter, Dix Hills; Michael H. Zemering, Plainview; Frank Shannon, Lindenhurst, all of N.Y.

[73] Assignee: David P. Gordon, Stamford, Conn.

[21] Appl. No.: 738,283

[22] Filed: May 28, 1985

[51] Int. Cl.⁴ .......................................... H04N 5/265
[52] U.S. Cl. .................................... 358/183; 358/22; 358/142; 358/194.1; 358/903
[58] Field of Search ................... 358/188, 194.1, 189, 358/190, 85, 191.1, 183, 903, 141, 142, 146, 147, 22; 455/151, 131, 603

[56] References Cited

U.S. PATENT DOCUMENTS

| | | |
|---|---|---|
| 3,440,427 | 4/1969 | Kammer . |
| 3,493,674 | 2/1970 | Houghton . |
| 3,833,757 | 9/1974 | Kirk . |
| 3,936,868 | 2/1976 | Thorpe .................................. 358/22 |
| 3,991,792 | 6/1975 | Kimura . |
| 3,996,583 | 12/1976 | Hutt ............................. 340/324 AD |
| 4,026,555 | 5/1977 | Kirschner et al. .................. 358/903 |
| 4,052,719 | 10/1977 | Hutt ............................. 340/324 AD |
| 4,096,524 | 6/1978 | Scott ..................................... 358/85 |
| 4,134,127 | 1/1979 | Campioni ............................. 358/16 |
| 4,139,860 | 2/1979 | Micic ................................... 358/22 |
| 4,161,728 | 7/1979 | Insam ................................. 340/750 |
| 4,203,130 | 5/1980 | Doumit ............................. 358/183 |
| 4,205,343 | 5/1980 | Barrett .............................. 358/147 |
| 4,218,698 | 8/1980 | Bart ................................... 358/22 |
| 4,231,031 | 10/1980 | Crowther ......................... 340/695 |
| 4,233,628 | 11/1980 | Ciciora .............................. 358/147 |
| 4,249,211 | 2/1981 | Baba et al. ......................... 358/183 |
| 4,261,006 | 4/1981 | Weintraub ............................ 358/3 |
| 4,264,924 | 4/1981 | Freeman ............................. 358/86 |
| 4,270,145 | 5/1981 | Farina ................................ 358/188 |
| 4,288,809 | 9/1981 | Yabe ................................... 358/12 |
| 4,337,480 | 6/1982 | Bourassin et al. .................. 358/183 |
| 4,337,483 | 6/1982 | Guillou .............................. 358/114 |
| 4,344,090 | 8/1982 | Belisomi ........................... 358/183 |
| 4,390,901 | 6/1983 | Keiser ................................ 358/147 |
| 4,412,244 | 10/1983 | Shanley .............................. 358/22 |
| 4,413,281 | 11/1983 | Thonnart .......................... 358/147 |
| 4,425,581 | 1/1984 | Schweppe .......................... 358/148 |
| 4,456,925 | 6/1984 | Skerlos et al. ....................... 358/85 |
| 4,477,830 | 10/1984 | Lindman et al. ................... 358/183 |
| 4,495,654 | 1/1985 | Deiss ................................. 455/151 |
| 4,496,976 | 1/1985 | Swanson et al. ................... 358/183 |
| 4,547,804 | 10/1985 | Greenberg ......................... 358/142 |
| 4,566,034 | 1/1986 | Harger et al. ..................... 455/151 |

Primary Examiner—Tommy P. Chin
Attorney, Agent, or Firm—David P. Gordon

[57] ABSTRACT

The electronically controllable system of the invention for viewing on a television, updateable television programming information comprises a microcontroller which is partially controllable by remote control system and is updateable via telephone link, magnetic cards or floppy disks, or television or radio subcarrier, the microcontroller including input/output interfaces, a microprocessor and a RAM; a mixer for mixing a regularly received television signal with the signal generated by the microcontroller; an RF converter for receiving the radio frequency information from the mixer, microcontroller, and television antennae and properly converting the information into information which may be sent to the television; and a remote control system for permitting the viewer to direct the microcontroller to perform searches on information contained in the RAM so as to provide on the television screen in a chosen format, subsets of information desired by the viewer. The system preferably also includes a ROM for directing the microcontroller to access the information link should the RAM lose information due to power failure.

19 Claims, 3 Drawing Sheets

SYSTEM FOR ELECTRONICALLY CONTROLLABLY VIEWING ON A TELEVISION UPDATEABLE TELEVISION PROGRAMMING INFORMATION

BACKGROUND

The present invention broadly relates to a system which may be attached to, or manufactured within a television set which permits the television owner who subscribes to a particular information service, upon demand, to view on the television screen desired television programming information and subsets thereof. More particularly, the present invention permits the subscriber to controllably view at his leisure the provided updated information such that the information or desired subsets thereof may be viewed on the television either to the exclusion of the received TV signal, or as an overlay to the viewed TV program, or as a window on the screen.

Numerous television accessories, special purpose TV systems, and methods of transmitting auxiliary information to a TV receiver are known in the art. For example, U.S. Pat. No. 4,344,090 to Pietro Belisomi et al., discloses a picture display device which uses a ROM to keep coded data corresponding to a television picture in memory. The coded data is perceived as containing advertising or television operating instructions which may be viewed upon demand and which may be superimposed upon or viewed as an alternative to the received video signal. U.S. Pat. No. 4,288,809 to Yabe describes transmitting alphanumeric information during the blank field intervals of video signals. The added information is identified by an identification code and is stored in temporary memory means for display on the television. The patent further describes an index switch which permits the viewer to determine by an overlay on the screen, which alphanumeric programs are available. The index listing is contained on a RAM which may be updated by the blank field interval transmitted data. The Insam U.S. Pat. No. 4,161,728 discloses means for displaying "Teletext" and/or "Viewdata" information; the former being information sent during field blanking of video information, and the latter being information sent from telephone. The patent describes means with a memory unit for storing information to be displayed, a display unit for synchronizing and producing addresses to memory containing the information to be displayed, a decoder unit, a control unit which is accessible through remote control, and a microprocessor which is responsive to programmed instruction. The Keiser U.S. Pat. No. 4,390,901 suggests the coding of the type of television programming which is available. The code information would be provided during the vertical blanking gap of the video signal and would be compared to the code contained in the receiver so that a video recorder could be turned on or off depending on how the viewer has programmed the same.

U.S. Pat. No. 4,052,719 to Hutt et al. describes the transmission of auxiliary information during the field blanking intervals of video signal transmission. On the receiving end, a television receiver system has a RAM for collecting and storing information, a selector, and a reading device. The stored information is fed to a character generator repeatedly after the memory is filled. The viewer has the choice of viewing the video signal or the auxiliary information separately or together on the screen. U.S. Pat. No. 4,270,145 to Farina discusses the use of an alphanumeric character generating circuit with memory and processor for controllably superimposing the time, channel, and other similar information on the video screen. The Doumit et al. U.S. Pat. No. 4,203,130 describes the display of program schedule information and other data to cable subscribers. The information is mixed into the transmission signal on the transmission end and is displayed on the entire television screen.

While all of the above-summarized patents are useful in providing additional information to the viewer, none of the patents permits the viewer to controllably view at his leisure periodically updated information regarding television programming and subsets thereof as either an overlay or window on the display of the received television signals, or as a full screen display.

SUMMARY OF THE INVENTION

It is therefore an object of the invention to provide a system for electronically controllably viewing on a television, updateable television programming information and subsets thereof.

It is a further object of the invention to provide a system which permits a television viewer to obtain, at leisure and upon command, updated television programming information and subsets thereof as an overlay or window on the display of other television signals, or as a full screen display.

It is yet a further object of the invention to provide a system for electronically controllably viewing on a television, updateable television programming information and subsets thereof, and other information and subsets thereof, the information being provided via telephone link downloading, magnetic cards or floppy disks, or through the use of television or radio subcarriers.

In accord with the objects of the invention, the electronically controllable system of the invention comprises: an eight bit microcontroller which is partially controllable by remote control system and is updateable via telephone link, magnetic cards or floppy disks, or television or radio subcarrier, the microcontroller including input/output interfaces, a microprocessor and an updateable memory; a mixer for mixing a regularly received television signal with the signal generated by the microcontroller; an RF converter for receiving the radio frequency information from the mixer, microcontroller, and television antennae and properly converting the information into information which may be sent to the television; and a remote control system for permitting the viewer to direct the microcontroller to perform searches on information contained in the updateable memory so as to provide on the television screen in a chosen format, subsets of information desired by the viewer. The system preferably also includes a ROM for directing the microcontroller to access the information link should the RAM lose information due to power failure.

In operation, one embodiment of the system of the invention would perform as follows. At a given time on a given date, a subscriber's electronically controllable system of the invention would dial the telephone number of a central computer whose system would be hooked up to the system invention. A week's information, including television listings by code such that subset searches could be accomplished, would be downloaded from the central computer into the updateable memory of the microcontroller which would overwrite the old information with the new information which would be stored therein. Additional information such as local railroad schedules, movie theater listings, etc. could also be included in the downloaded information. When the subscriber wished to watch television, he could watch undisturbed, as the RF signal, including any signal received via cable, would be plugged into the RF section of the invention system which would directly output the signal onto the television. When the subscriber wished to see program listings, he would use a remote control device to access the microcontroller. By making commands by code, the viewer could demand to see a television schedule for certain dates and times. By making additional commands, the viewer could demand to see subsets of information such as the movies to be shown during the week or all the sports programs available on the Sunday of that week. The viewer could command that the information appear as an overlay on or as a window in the television picture being seen, or as a full screen display. The viewer could also command that the information be scrolled. All of the viewer's commands would be carried out by the microcontroller which would output the desired information to the mixer which in turn would feed the signals to the RF section for output to the television.

A better understanding of the invention, and additional advantages and objects of the invention will become apparent to those skilled in the art upon reference to the detailed description and the accompanying drawings.

DETAILED DESCRIPTION OF THE PREFERRED EMBODIMENTS

Figure 1:
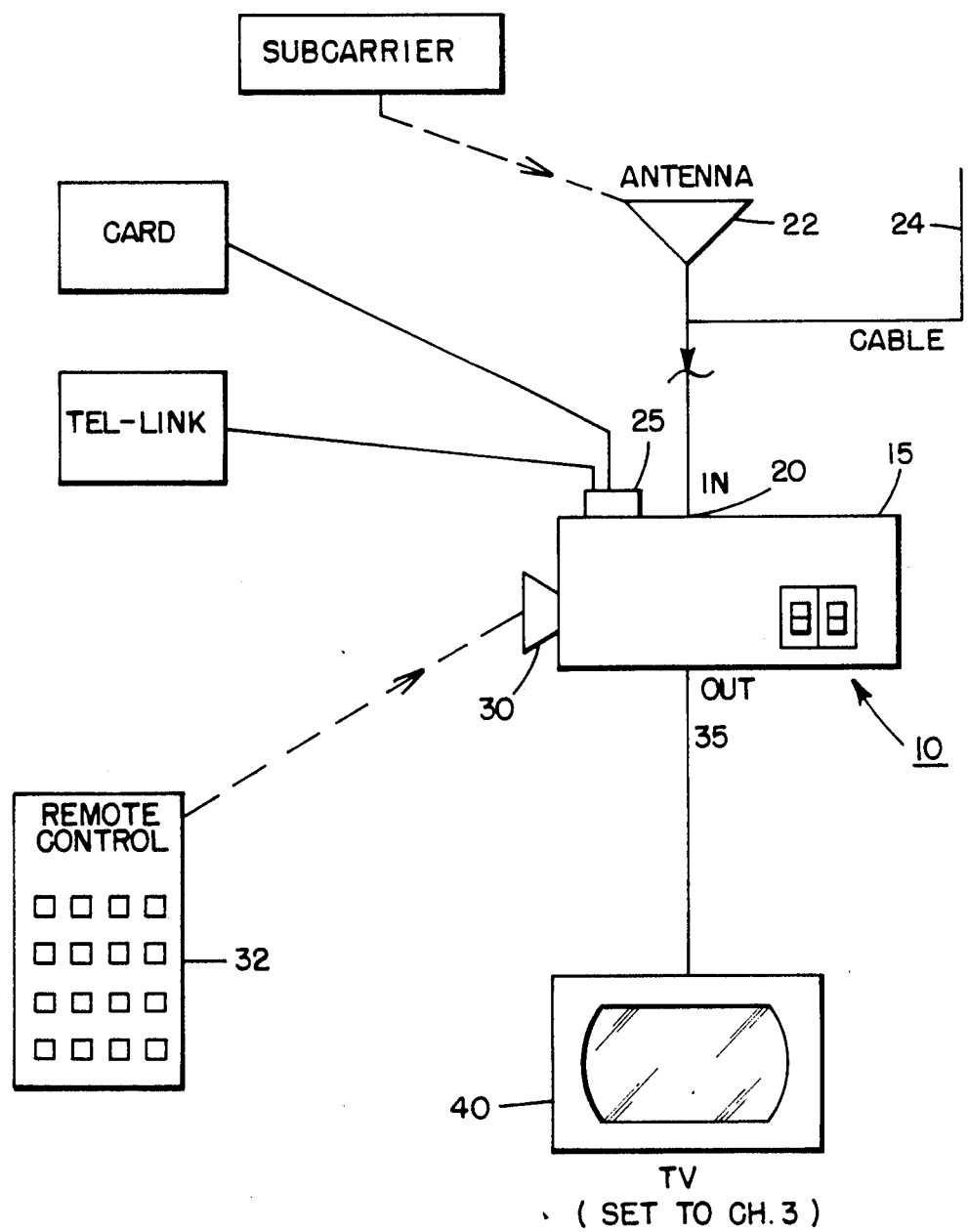
FIG. 1 is a schematic diagram of the external connections of the system invention which permits the system to be updated and accessed.

The external connections of the system invention are seen in FIG. 1. The system, generally denoted by 10, is self-contained in a box 15 which receives television signals at input 20 via antenna 22 and/or cable 24. Box 15 also has an input port 25 which comprises either means for receiving and reading magnetic cards or floppy disks or means for receiving a telephone link, such as a modem. Antenna 22 also functions as an input port for receiving television or radio subcarrier information, although if desired, port 25 can be configured to receive such information. Additionally, on the input end, box 15 includes receiver 30 for receiving commands of the viewer either by remote control via remote control box 32, or by wire connection. The commands of the viewer direct box 15 to tune the receiver to a particular rf channel coming via antenna 22 or cable 24 for output, and/or to process information received via input port 25 or antenna 22 (subcarrier information) for output. Upon receiving information from one or more of the three input sources, box 15 outputs information from output port 35 to the television 40. It should be appreciated that box 15 can be included within a television upon manufacture if desired.

Figure 2:
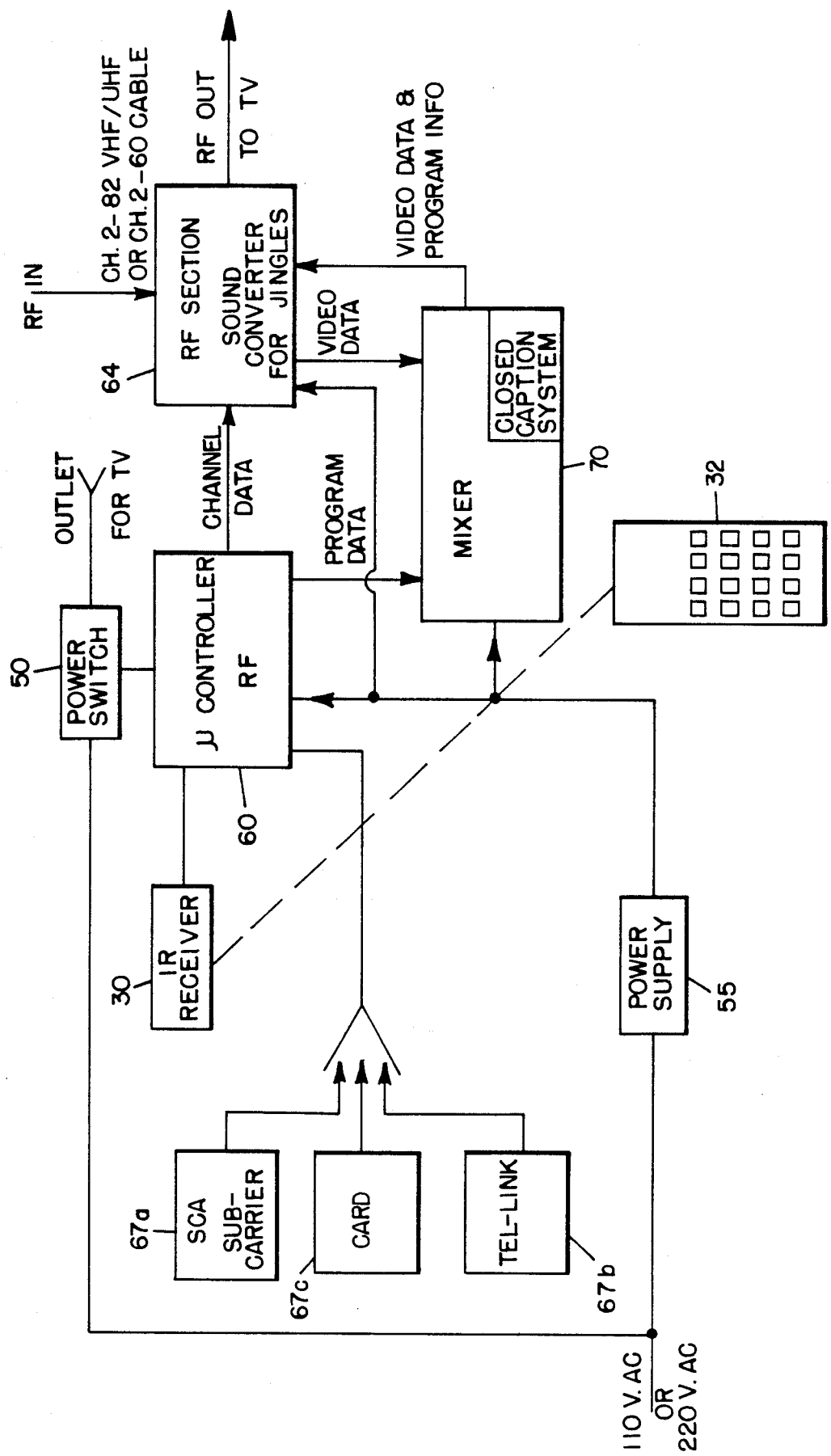
FIG. 2 is an electronic block diagram of the system invention.

Turning to FIG. 2, a flow diagram of the preferred embodiment of the electronics of the system invention is seen. Power switch 50 is used for turning the system on or off and may be driven by a standard electrical outlet. When the system is turned on, power supply 55 is used to provide the low voltages necessary to power the microcontroller 60. When the system is off, television signals received, such as VHF/UHF channels 2-82, or cable channels 2-62, are sent directly through RF section 64 to the television 40 for viewing.

Microcontroller 60 comprises an eight-bit microprocessor, input/output interfaces, and an updateable memory which is preferably a 32K random access memory (RAM). Those skilled in the art will of course appreciate that each element of microcontroller 60 may be separately provided, and that the microprocessor could be other than eight-bit, while the updateable memory could comprise a RAM, a hard disk, a floppy disk, bubble memory, tape, etc. and could be other than 32K in dimension. The microcontroller is designed to receive instructions from infrared remote control unit 32 via infrared receiver 30, control unit 32 being controllable by the viewer. The system 10 may therefore function simply as a remote control device which permits the viewer to change channels. In this mode, according to the command of control unit 32, the microcontroller 60 instructs RF section 64 as to which channel is to be received from antenna 22 or cable 24 and sent to the television 40 for viewing on locally non-used channel 3 or 4.

As indicated in FIG. 2, the random access memory or updateable memory of microcontroller 60 is subject to updating via electronic media. The particular medium chosen could be radio or television subcarrier 67a (via antenna 22 and RF section 64 if desired), telephone link 67b, magnetic cards or floppy disks 67c, or equivalents to any or all of the above. Regardless of the method of updating the RAM of microcontroller 60, the system 10 must additionally include suitable hardware and/or software for the updating task, such as a modem if telephone link 67b is utilized.

Using telephone linkage as an example, information regarding television scheduling, local movie listings, railroad schedules, local sporting events, theater listings, etc., can all be provided on a central computer which may have self-dial capabilities. At a given time on a given day, the computer can sequentially dial the telephone numbers of all subscribers having the system invention herein described, or the electronically controllable system can dial the central computer. When contact is made between the central computer and box 15 via the modem at input port 25, the computer can download all of the relevant information into the RAM of microcontroller 60, thereby providing "updated" information by overwriting any information contained in the RAM. This information may then be processed and accessed in accord with the remote control instructions of the television viewer.

In order to receive information, the viewer, in essence, must direct the microcontroller 60 through a series of steps. First, the viewer might access the system microcontroller by pressing the # button on his remote control box 32. The viewer might then request that the information that he is about to demand be output on the television screen in a particular format. Thus, different codes could be used for output formats such as a window or overlay format, or a full screen display. Finally, the viewer would then request to see information contained in the RAM. For example, through a set of codes, the viewer might direct the microcontroller to output the television programming schedule for the week. The microcontroller, as a result of the commands, would direct RF section 64 to send received video signals to mixer 70. The microcontroller would also then access the RAM, and send the information to mixer 70 which is then receiving video data from antenna 22 or cable 24 via RF section 64. The mixer 70, which is also powered by power supply 55, would take the information from microcontroller 60, convert it into a format which can be viewed in the same way is the video data received via RF section 64, and mix the two in accord with the output format directed by the microcontroller. The mixed signal would then be sent via RF section 64 to the television 40 for viewing by the viewer.

If the viewer wished to view a subset of the information, e.g., the television program schedule for the day, the viewer, through a different set of code signals which might include the direct keying of the date on the handheld remote control unit 32, could then direct the microcontroller to output only a part of the information stored in the microcontroller RAM. Likewise, if the viewer wished to see a listing of the sports events being shown on television on a particular day, the viewer could direct the microcontroller to search through the information in the RAM and retrieve only the requested information. In order to accomplish such a task, the television programming information in the RAM must be coded, not only by time of day and date, but by subject matter, such as sports, movies, documentaries, sit-coms, news, game shows, soap operas, etc. This coding is accomplished, as those skilled in the art will readily appreciate, prior to the coded information being sent to microcontroller 60. If desired, a "scrolling" or "next full screen" feature may be added to facilitate easier viewing.

The invention envisions that additional information other than television scheduling information may be contained within the RAM of microcontroller 60. Thus, for example, local theater and movie theater showings and time schedules, as well as community events, railroad time schedules, local sports events, etc. may be included and accessed. Likewise, specific critical reviews of movies or shows may be included for reading by the viewer. Indeed, if desired, mass media advertising could be accomplished according to the invention. An advertiser could arrange to have a message included in information down-loaded into the RAM of microcontroller 60. The message might be accompanied by digital sound information which could be converted into analog signals in the RF section 64 and which would be perceived as electronic music. In this manner, a jingle or theme song might accompany the advertising message.

Figure 3:
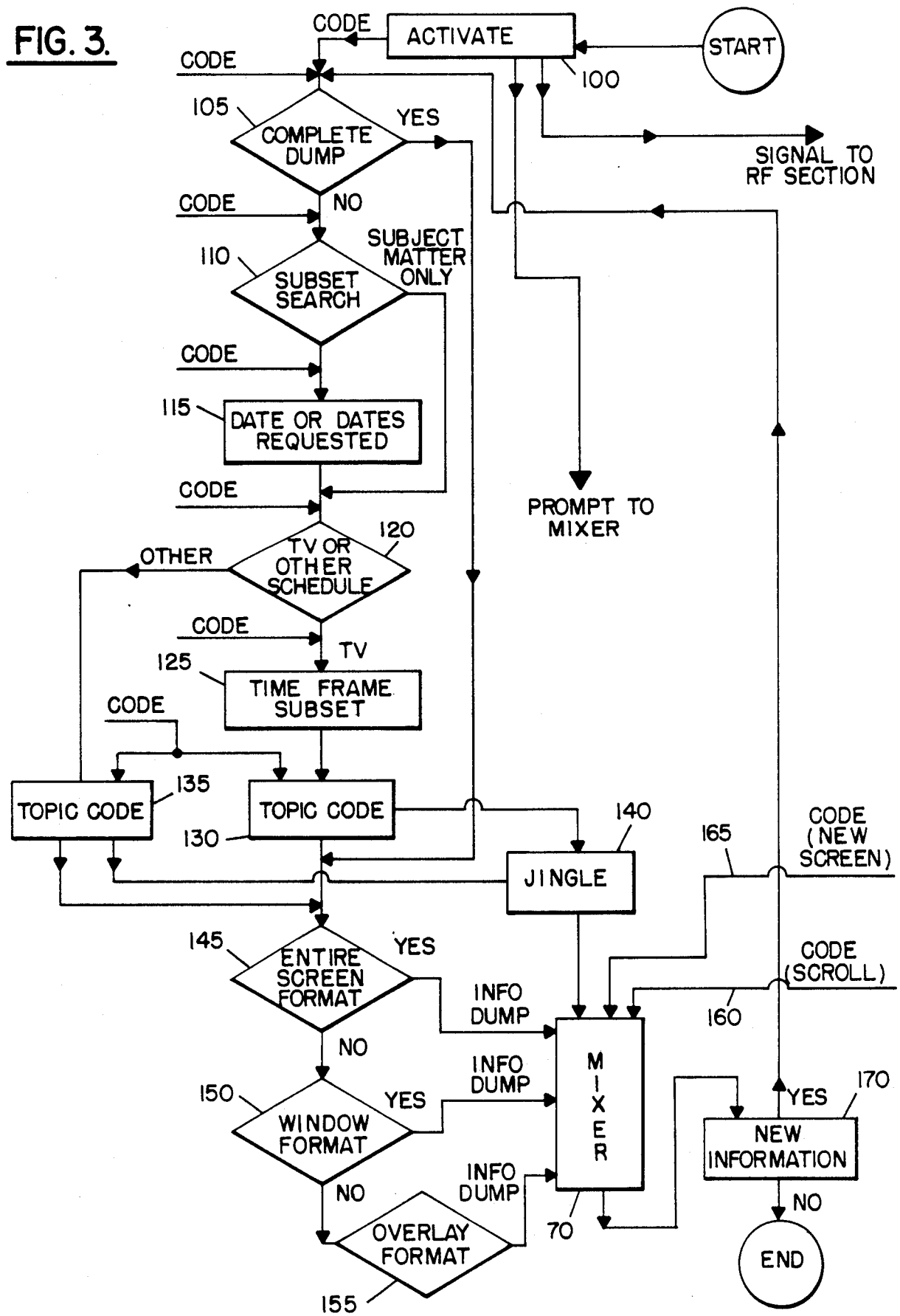
FIG. 3 is a flow diagram of the inner functionings of the microcontroller of the system invention.

In order to accomplish the quick display of the requested information, microcontroller 60 must be logically arranged. Thus, as seen in FIG. 3, in order to activate the system of the invention, the proper code must be sent at 100 via remote control by the viewer. In response to activation, the microcontroller directs RF section 64 to send the received video information to mixer 70. The microcontroller 60 might also output a prompt message to mixer 70, so that the viewer is made aware of the status of the system, including, if desired, the contents of the RAM. The microcontroller would then await further instructions of the viewer.

The next command of the viewer at 105 might indicate whether the viewer wished to see all of the information contained in the RAM, e.g. a complete dump of the RAM, or whether a subset of that information was desired. If a complete dump was requested, the microcontroller would direct the viewer to choose a format of display, as is discussed hereinafter. If a subset search is requested, the viewer might be asked whether the subset is by subject matter only, or both date and subject matter. If the subset search is by both date and subject matter, the viewer must key in the date or dates requested at 115. At 120, the viewer indicates whether the subset of information desired to be seen relates to television scheduling or to other scheduling information contained in the RAM of microcontroller 60. If television scheduling is desired, the viewer is asked at 125 and 130 to key in the time frame which is desired, e.g. #6 11, which would be 6–11 P.M., and the topic code desired. In this manner, the microcontroller would perform the function of a microprocessor in performing a search on the information contained in the RAM and determining, for example, a listing of all the television movies that are to start between 6 and 11 P.M. on a particular date. Of course, if other scheduling is requested, a similar topical search can be accomplished at 135. If desired, according to the topic requested, advertising information may also be sent by the microcontroller to jingle generator 140 which might generate the jingle signals concurrently with the showing of the information, or directly thereafter.

After the viewer has directed the microcontroller to perform its subset search, the viewer is directed to determine the format output of the information found. Thus, at 145, the viewer is asked whether an entire screen format is desired. If not, at 150, the viewer is asked whether a window format is desired. If not, the viewer is supplied at 155 with a television overlay format. In the latter two situations, the viewer may continue to view the television program he is currently watching.

When all of the subset criteria have been chosen, including dates, times, topics, formats, etc. the microcontroller performs a search of the information in the RAM. The determined information located by the microcontroller is then controllably sent to the mixer which, in accord with instructions from the microcontroller, properly mixes the requested information with the rf video data being received from the antenna or cable. In addition, at 160 and 165, the mixer is told by the viewer, via instructions of the microcontroller, whether to scroll the desired information, or whether and when to display new full windows or screens of information. After the search has been accomplished and displayed, the viewer may then choose at 170 whether to perform an additional search, or whether to exit the system.

Those skilled in the art will appreciate that the content and order of the program contained in microcontroller 60 which is shown in flow diagram format by FIG. 3 may be changed without deviating from the scope of the invention, provided that subset searches may be controllably accomplished. Thus, for example, if information not relating to television is stored in the microcontroller RAM, that information may be broken down not only by topic, but by time. Moreover, the microcontroller could be arranged such that searches could be accomplished in both the television and non-television subsets, and that the output could be integrated such that, for example, television and local movie theater movies could be listed together by time for particular days. A plethora of other minor changes will be readily appreciated by those skilled in the art.

Because the system invention relies on a RAM for the storage of information, the system must always be powered. If a power outage occurs, the RAM will lose its information. To overcome this problem, in one embodiment of the invention, a ROM is included which is programmed to automatically dial a central computer and output a particular code upon being initially powered. Thus, if the system invention were to lose power with the RAM of microcontroller 60 losing information, the ROM would call the central computer which would then update the RAM with all of the programming and scheduling information after receiving the code. The ROM could also take the form of a PROM or EPROM and be used to permit the owner of the television and system invention to control access to the television, or access to particular television channels. In order to control access, the RAM could instruct the viewer to input a personal code number which would be stored in the ROM and which would act as a password for all future uses of the system and/or television.

Another embodiment of the system invention provides for the availability of closed captioning for those who have difficulty hearing. As is well known in the art, captioning information may be sent via subcarrier, as by during the blanking interval of the video signal of the television station. This information may then be sent through RF section 64 to mixer 70. The mixer would place the captioning in a corner box of the screen format, and the so-mixed signal would be sent to the television via the RF section 64.

There has been described and illustrated herein, systems in accordance with the present invention for electronically controllably viewing on a television, updateable programming information. While particular embodiments of the invention have been described, it is not intended that the invention be limited exactly thereto, as it is intended that the invention be as broad in scope as the art will permit. Thus, those skilled in the art will recognize that while the invention was described as including an infrared remote control system with a standard remote control box, other remote control systems could be used. Indeed, instead of the standard remote control box which typically has numbers and a few control symbols, an alphanumeric remote control box could be supplied. In this manner, the viewer could communicate with the microcontroller in English (or other spoken language), rather than by code words containing control symbols and numbers. Moreover, various prompt messages, including instructions, can be included in the ROM or RAM provided for by the invention, thereby permitting the system to be "user friendly". Likewise, while the invention was described mostly with regard to the use of a telephone linkage as the electronic updating medium, magnetic cards or floppy disks could be used in lieu thereof by sending them via the mails to subscribers, or selling them at grocery stores or news shops for insertion into a disk drive or port which would be part of the system.

Additional changes to the system may be made by including one or more of the elements in a single piece of hardware, or by dividing a single element into many individual pieces. Thus, for example, the microcontroller, mixer and RF section could be combined into a single hardware chip. Conversely, the microcontroller could be divided into a microprocessor, a RAM, and the various I/O interfaces. Indeed, various combinations of all the elements could be made to suit vaious needs. Therefore, it will be apparent to those skilled in the art that other changes and modifications may be made to the invention as described in the specification without departing from the spirit and scope of the invention as so claimed.

We claim:

1. A system for electronically controllably viewing updateable information on a television having a screen comprising:
    (a) a microcontroller including input/output interfaces, a microprocessor, and an updateable memory comprising at least a RAM, said RAM of said microcontroller being updateable via an electronic medium and storing updated information including at least television programming information;
    (b) a mixer for mixing a regularly received television signal with the signal generated by the microcontroller in accord with instructions of said microcontroller;
    (c) an RF section for receiving instructions from said microcontroller and for receiving radio frequency information from the mixer and a television station and properly converting the information into video signals which may be sent to said television for viewing; and
    (d) a remote control system, said microcontroller being controllable by said remote control system, for permitting a viewer of said television to direct said microcontroller to perform a search on at least said updated television programming information contained in said RAM of said microcontroller, a subset of at least said updated television programming information being output to said mixer so as to provide on the television screen television programming information desired by the viewer in a desired format.

2. A system according to claim 1, wherein:
said electronic medium for updating said RAM comprises telecommunications means including a central station computer and a modem.

3. A system according to claim 2, further comprising:
    (e) a ROM for communicating with said central station computer after a power outage to said system for electronically controllably viewing updateable information.

4. A system according to claim 1, wherein:
said electronic medium for updating said RAM comprises an electromagnetic record.

5. A system according to claim 1, wherein:
said electronic medium for updating said RAM comprises a radio frequency subcarrier.

6. A system according to claim 1, wherein:
said information contained in said updateable memory includes further advertising information.

7. A system according to claim 6, further comprising:
    (e) sound converting means, wherein said updateable memory stores digital sound information.

8. A system according to claim 1, wherein:
said desired format of said information desired by said viewer is as a window in the picture resulting from said regularly received television signal.

9. A system according to claim 1, wherein:
said desired format of said information desired by said viewer is as an overlay on the picture resulting from said regularly received television signal.

10. A system according to claim 1, wherein:

said desired format of said information desired by said viewer is a full screen display.

11. A system according to claim 1, wherein:
said television programming information provided to said screen includes at least the time, channel and program name of at least one scheduled televised program.

12. A system according to claim 1, wherein:
said information provided to said screen includes information regarding at least two scheduled television programs.

13. A system for electronically controllably viewing updateable information on a television having a screen, comprising:
   (a) a microcontroller including input/output interfaces, a microprocessor, and an updateable memory for maintaining a data base of information, said updateable memory of said microcontroller being updateable via an electronic medium;
   (b) a mixer for mixing a regularly received television signal with the signal generated by the microcontroller in accord with instructions of said microcontroller;
   (c) an RF section for receiving instructions from said microcontroller and for receiving radio frequency information from the mixer and a television station and properly converting the information into video signals which may be sent to said television screen for viewing; and
   (d) a remote control system which can control said microcontroller, for permitting a viewer of said television to direct said microcontroller to perform a search on said data base information contained in said updateable memory of said microcontroller, wherein said data base information comprises at least television scheduling information having code indicative of at least scheduled airing date and time of day, such that said microcontroller, upon direction from a viewer via said remote control system, may search said data base for the television scheduling information for a predetermined interval of days and time of day which is the intersection of the subset of said information having code indicative of said predetermined date interval and said subset of said information having code indicative of said predetermined time interval, and as a result of said search, said intersection of subsets of said information data base is output to said mixer so as to provide on the television screen the information desired to be viewed by the viewer in a desired format.

14. A system according to claim 13, wherein:
said television scheduling information of said data base includes code indicative of subject matter, such that said search on said data base is by at least date, time of day, and subject matter, and such that said subset of information output to said mixer is at least the group of television programs of at least a predetermined subject matter scheduled to be aired during a given date interval and time of day interval, which is the intersection of the subset of said data base information including code indicative of said predetermined subject matter with the subset of data base information including code indicative of said date interval with the subset of data base information including code indicative of said time interval.

15. A system according to claim 14, wherein:
said updateable memory comprises a RAM, and said electronic medium for updating said RAM is selected from a group consisting of an electromagnetic record, a radio frequency subcarrier, and a central station computer with a telephonic link and a modem.

16. A system according to claim 15, wherein said electronic medium consists of a central station computer with a telephonic link and a modem, further comprising:
   (e) a ROM for communicating with said central station computer after a power outage to said system for electronically controllably viewing updateable information.

17. A system according to claim 15, wherein:
said desired format of said information desired by said viewer is selected from a group consisting of, a full screen display, an overlay on the picture resulting from said regularly received television signal, and a window in the picture resulting from said regularly received television signal.

18. A system according to claim 14, wherein:
said data base of information contained in said updateable memory includes advertising information.

19. A system according to claim 18, further comprising:
   (e) sound converting means, wherein said updateable memory stores digital sound information in said data base.

* * * * *